Nov. 24, 1959  R. J. ERNST  2,914,653

FUSION ARC TIMING AND POSITIONING DEVICE

Filed Jan. 27, 1958  2 Sheets-Sheet 1

INVENTOR.
ROBERT J. ERNST,
BY
ATTORNEY.

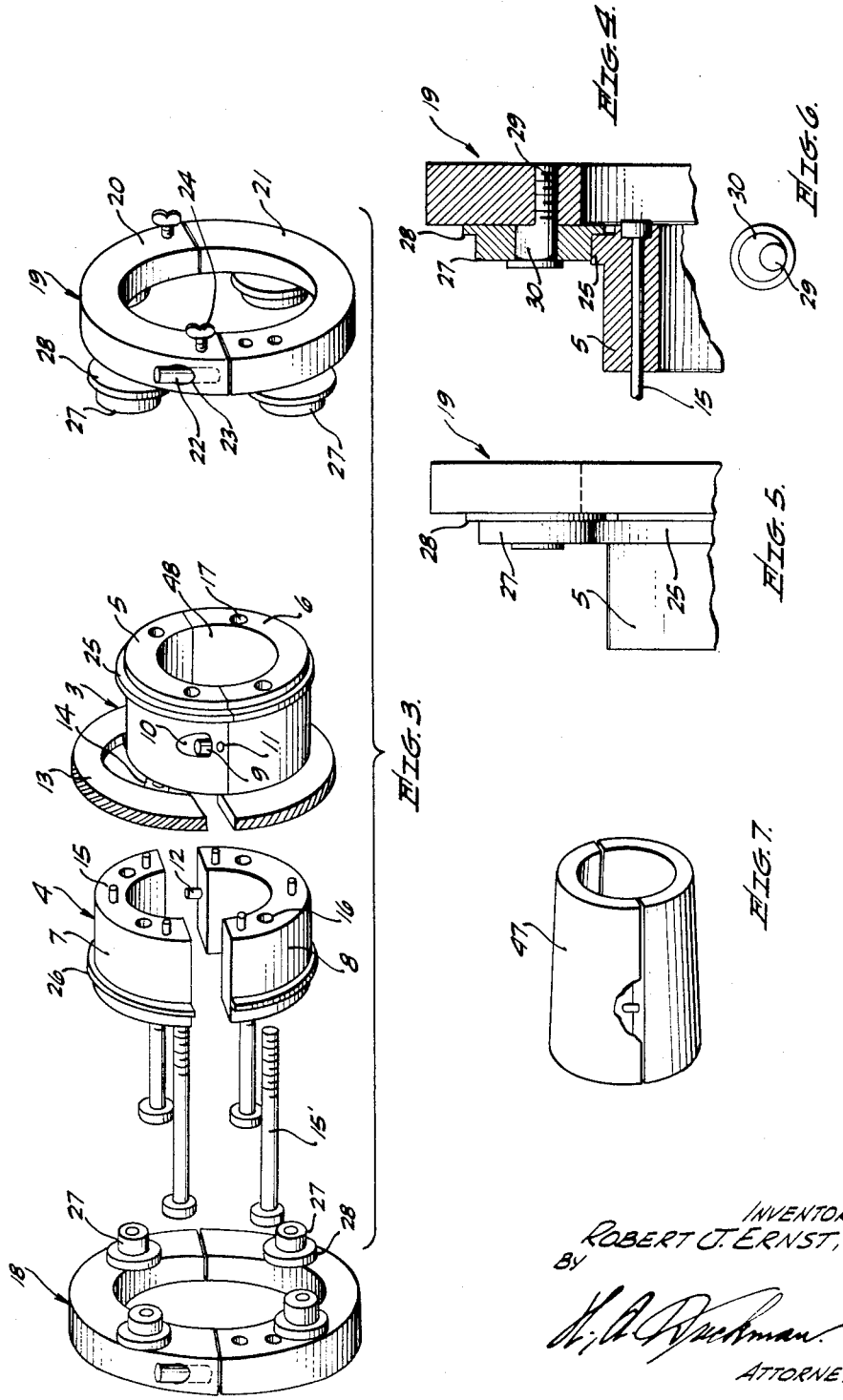

United States Patent Office 2,914,653
Patented Nov. 24, 1959

2,914,653

FUSION ARC TIMING AND POSITIONING DEVICE

Robert J. Ernst, Huntington Park, Calif., assignor to Ernst & Ernst, Huntington Park, Calif., a copartnership Application January 27, 1958, Serial No. 711,227

12 Claims. (Cl. 219—125)

This invention relates to a fusion arc timing and positioning device whereby the butted ends of tubing may be effectively fused and joined, so that a substantially smooth inner surface is provided at the joint to prevent accumulation of material within the pipe at the fused joint, and also to prevent the accumulation of bacteria within the pipe if the material conveyed is of a type which would permit the growth of bacteria.

An object of my invention is to provide a novel fusion arc timing and positioning device in which the butted ends of the tubing at the joint are fused completely and fully because of the proper and full heat penetration at a proper controlled speed. In my device both the speed and the heat of fusion can be controlled.

Another object of my invention is to provide a novel fusion arc timing and positioning device, in which various size tubing can be positioned in the device as required, the device being separable to permit the addition of properly sized sleeves to fit the different sized pipe.

Another object of my invention is to provide a novel fusion arc timing and positioning device in which the speed of the fusion arc tip relative to the tubing is constant, and also at the correct rate so that an effectively fused joint is formed. Also the fusing arc and the tip from which it is formed is held at the proper angle relative to the work, so that the welded joint is properly and completely fused. Furthermore, my weld is smooth and uniform on the inside of the tubing so that bacteria accumulation is prevented.

Another object of my invention is to provide a novel fusing device of the character stated, in which it is possible to either rotate the work and maintain the fusing device in a stationary position, or to hold the work stationary and rotate the fusing device around the work. With either of these arrangements the fusing tip is held in a fixed position relative to the work, and is moved steadily around the tubing and also concentric with that tubing so that the fusing arc is always correctly positioned to produce a proper weld. Also in my construction the tip of the fusing rod can be held at the proper angle to the work so that the oncoming surface of the tube which is to be fused will be properly preheated, and also the surface of that tube which has already been fused will not be continuously heated to the detriment of the weld.

Another object of my invention is to provide a novel fusing device of the character stated, which can be assembled around the tubing if necessary, in that the device is made in complementary parts which are held in proper position by means of dowels, pins, or the like, and which can thus be either assembled or disassembled very quickly and easily by the workman as required. The parts of my fusing device are, therefore, so constructed and arranged that they can be easily manipulated by the workman, and also can be transported from place to place as required, and also are so accurate that the positioning of the fusing tip, the speed of rotation of the work, or of the fusing device will remain constant irrespective of the assembly or disassembly of the device.

Other objects, advantages and features of invention may appear from the accompanying drawings, the subjoined detailed description and the appended claims.

*In the drawings*

Figure 3 is an exploded view of the positioning and driving portions of my device.

Figure 4 is a fragmentary vertical sectional view of one of the supporting rings.

Figure 5 is a fragmentary side elevation of the same.

Figure 6 is an end view of one of the eccentric and adjustable roller mountings.

Figure 7 is a perspective of one of the removable sleeves.

Figure 1:
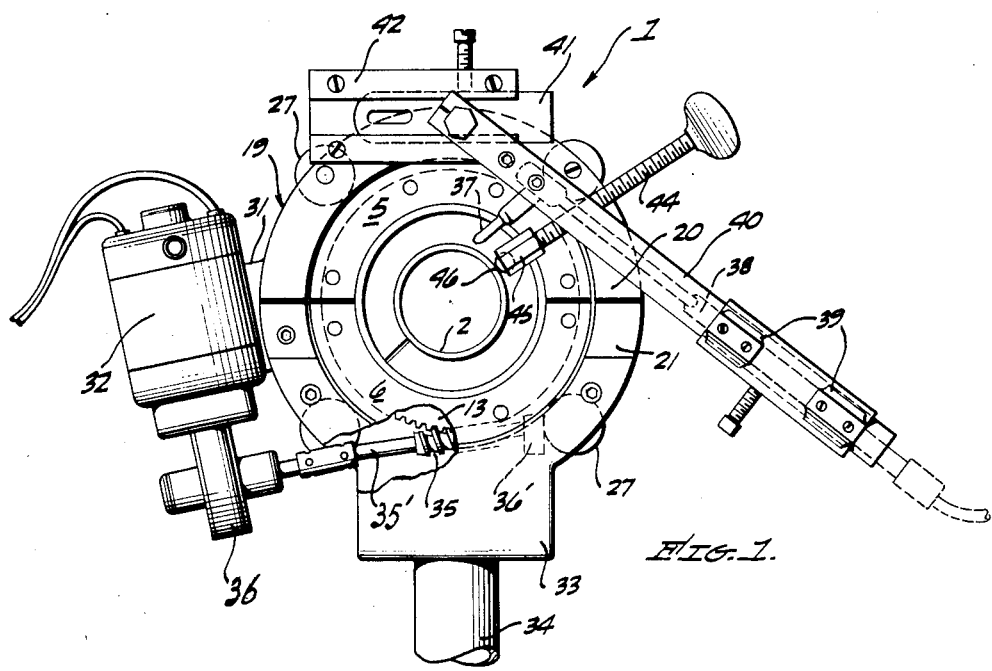
Figure 1 is an end view of my fusion arc timing and positioning device.
Figure 2:
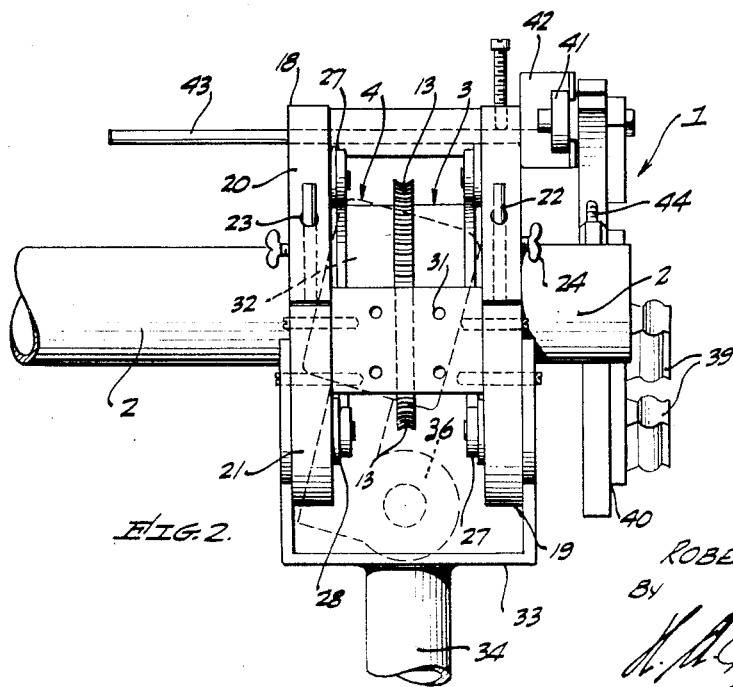
Figure 2 is a side elevation of the same as viewed from the left in Fig. 1 and with the driving motor removed.

Referring more particularly to the drawing, my fusing device 1 is adapted to fuse the butted ends of thin walled tubing 2. This tubing may be held stationary in a suitable vise or the like (not shown), and in this instance my fusing device 1 is cause to rotate around the tubing 2 while the weld is being accomplished. Or the fusing device 1 can be held stationary, in which instance the tubing 1 is caused to rotate within the fusing device, and it is this latter instance which I will here describe in detail. However, the construction of the fusing device is the same whether it is stationary or whether it rotates around the tubing. A pair of cylinders 3—4 are formed in complementary halves 5—6 and 7—8, respectively. A dowel 9 projects from the upper surface of the part 6 and fits into an appropriate hole or opening 10 so that the parts 5—6 are properly aligned and are held in assembled position to form the complete cylinder 3. A set screw 11 holds the dowel in the part 5 to prevent the parts 5—6 from accidentally coming apart. The parts 7—8 of the cylinder 4 are similarly held together by means of the dowel 12 which projects from the part 8 and fits into a proper hole in the part 7, the same as the hole 10 previously described. Thus the cylinders 3 and 4 are each formed of two complementary halves which can be disassembled to permit their removal from around the tubing 2, or to permit their assembly around the tubing, as might be required. A ring gear 13 is mounted between the cylinders 3 and 4 and is also formed in two complementary halves, as shown in Fig. 3, so that this ring gear may be disassembled or assembled in the same manner as the cylinders 3 and 4 as previously described. The ring gear 13 is held in proper position between the cylinders 3 and 4 in the following manner: A plurality of inwardly projecting lugs 14 are formed on each of the halves of the ring 13 and these lugs are drilled to receive horizontally projecting pins 15 on the cylinder 4, each of these pins extending through a lug 14 when the cylinders 3 and 4 are assembled end to end, thus securely holding the ring gear in position between these cylinders. The cylinders 3 and 4 and the ring gear 13 are all held in proper related position by means of a plurality of long bolts 15' which extend through appropriate holes 16 in the cylinder 4, and appropriate holes 17 in the cylinder 3. Thus the cylinders and ring gear are held in proper alignment and in proper relationship and also so that these parts all move together. A pair of end rings 18—19 are positioned one at each end of the fusing device and these rings are identically constructed in the following manner: Each ring is formed of two complementary parts 20 and 21 which are semicircular in shape. The part 21 is formed with a pair of upwardly projecting dowels 22—22 which fit into appropriate holes 23 in the part 20. A set screw 24 engages each of the dowels 22 to hold the parts 20—21 in proper assembled position to form the complete ring.

In order that the assembled cylinders 3—4 and the ring gear 13 may be rotatably mounted on the end rings 18 and 19, I provide a journaling structure as follows: The cylinder 3 is provided with a raised track 25 and the cylinder 4 is formed with a similar raised track 26. The rings 18—19 are again identically constructed with the following bearing construction: A plurality of wheels 27 are mounted on the inner surfaces of the rings 18 and 19 as shown. These wheels are each provided with flanges 28 which engage one face of the raised track 25 for the purpose of taking the end thrust, and also to hold the assembled cylinders 3—4 in proper position relative to the rings 18—19. The wheels 27 are each mounted on a rotatable bearing member 29 which is threaded into the rings 18 or 19. The bearing member is provided with an eccentric journal 30 upon which the wheels 27 are mounted, so that by rotating the journal 30 the wheels 27 can be positioned relative to the cylinders 3 and 4 so as to properly engage the tracks 25 and 26 and to thus adequately support these cylinders.

The rings 18—19 are held in proper spaced relation by means of a block 31 which is also the mounting base for an electric motor 32. The block 31 is bolted to both of the rings 18 and 19 as shown. Also a yoke 33 extends between the rings 18—19 and is bolted to each other and thus additionally supporting the rings in proper spaced relation. A post 34 depends from the yoke 33 whereby the entire fusing device may be supported on a bench. A worm gear 35 meshes with the worm wheel 13 and the worm gear is mounted on a shaft 35' which extends from the gear box 36 which, in turn, is driven by the electric motor 32. At its outer end the shaft 35' is mounted in a bearing 36' positioned between the rings 18—19.

The fusing tip, indicated at 37, is mounted in proper angular relationship to the tubing 2 in the following manner: The holder 38 of the tip is held in the spring fingers 39 which project from an arm 40. This arm is pivotally attached to the side of the slide 41 which, in turn, is slidably mounted in the track 42. The track 42 is mounted on the rings 18—19 by a pin 43 which extends horizontally through these rings. An elongated bolt 44 is threaded through the arm 40 and this bolt is provided with a foot 45 on its inner end, the foot in turn having a ball bearing 46 journaled therein, this ball bearing engaging the tubing 2 to thus support the arm 40 in proper spaced relation to the periphery of the tubing, and also holding the fusing tip 37 in proper spaced relation to the tubing. By adjusting the bolt 44 it is possible to adjust the arc between the tip 37 and the surface of the tubing 2 to properly maintain this arc. Also the pivotal mounting of the arm 40 enables the welding tip 37 to properly follow the contours of the tubing 2 as the tubing rotates. The slide 41 may also be adjusted horizontally as required to position the fusing tip 37 lengthwise of the tubing 2.

To accommodate my fusing device to various sizes of tubing I provide appropriate split sleeves 47 as shown in Fig. 7. These sleeves are preferably formed in complementary halves and fit within the bores 48 of the cylinders 3 and 4 so that the same bore 48 in the cylinders will accommodate various sized tubing.

Assuming that my fusion arc timing and positioning device is used with the end rings 18—19 stationary, as well as the motor 32, and that the two cylinders 3—4 and the ring gear 13 is rotated, thus rotating the tubing 2. In this arrangement the rings 18—19 are held stationary and are supported on the post 34 which is suitably supported on a bench. A proper sleeve 47 is inserted in the cylinders 3—4 so that the tubing 2 will be tightly gripped. The arm 40 is now adjusted so that the welding tip 37 is properly positioned over the butted ends of the tubing 2, and the proper spacing of the tip 37 is provided for by adjusting the bolt 44 so that the foot 45 thereon and the ball bearing 46 properly engage the periphery of the tubing 2. The motor 32 is now started and the speed of rotation of the tubing 2 is controlled by the speed of the motor 32 through a proper rheostat (not shown). The fusing arc then fuses the butted ends of the tubing 2 and a proper clean and uniform joint is provided which is smooth on the inside without pits or pockets, and which has a slight bulge on the outside, indicating a good weld. If it is necessary to assemble my timing and positioning device on a long length of pipe and where the device cannot be slipped over the end of the pipe, then my device may be separated into its two complementary halves so that the device can be thus assembled around the pipe or tubing. This is accomplished by reason of the fact that the rings 18 and 19 are each formed in two complementary halves 20—21, the halves being joined by the dowels 22 which fit into appropriate holes 23 and are held in assembled position by the set screws 24. Similarly, the cylinders 3 and 4 are held together by the dowels 9 and 12 which fit into appropriate holes in the complementary member and are also secured by means of set screws 11. The ring gear 13 is also formed in two halves, the two halves being held in proper position to form a complete ring gear by the pins 15 which extend through the lugs 14, thus assembling the ring gear between the inner engaging edges of the two cylinders 3 and 4. Thus my fusing arc timing and positioning device can be moved from place to place as necessary, and can be either slipped over the end of the tubing which is to be welded, or it can be assembled around the tubing, whichever is most appropriate.

Having described my invention, I claim:

1. A fusion arc positioning and timing device for tubing comprising a pair of rings, said rings being spaced from each other, a cylinder, means journaling said cylinder on said rings, tubing holding means in the cylinder, a motor mounted on said rings, drive means extending from the motor to said cylinder, an arm, mounting means on said rings to support said arm adjacent to the tubing, and means on said arm engaging the tubing to space the arm from the tubing.

2. A fusion arc positioning and timing device for tubing comprising a pair of rings, said rings being spaced from each other, each of said rings being formed in complementary halves, means detachably securing the halves of the rings together, a cylinder, said cylinder being formed of complementary halves, means detachably securing the halves of the cylinder together, means journaling said cylinder on said rings, tubing holding means in the cylinder, a motor mounted on said rings, drive means extending from the motor to said cylinder, an arm, mounting means on said rings to support said arm adjacent to the tubing, and means on said arm engaging the tubing to space the arm from the tubing.

3. A fusion arc positioning and timing device for tubing comprising a pair of rings, said rings being spaced from each other, a pair of axially arranged cylinders, a ring gear positioned between the cylinders, means detachably securing the ring gear to the cylinders, means journaling said cylinders on said rings, tubing holding means in the cylinder, a motor mounted on said rings, drive means extending from the motor to the ring gear, an arm, mounting means on said rings to support said arm adjacent to the tubing, and means on said arm engaging the tubing to space the arm from the tubing.

4. A fusion arc positioning and timing device for tubing comprising a pair of rings, said rings being spaced from each other, each of said rings being formed in complementary halves, means detachably securing the halves of the rings together, a pair of axially arranged cylinders, said cylinders each being formed of complementary halves, means detachably securing the halves of both of the cylinders together, a ring gear, means detachably securing the ring gear to said cylinders and between said cylinders, tubing holding means in the cylinders, a motor mounted on said rings, drive means extending from the motor to said ring gear, an arm, mounting means on said ring to support said arm adjacent to the tubing, and means on said arm to space the arm from the tubing.

5. A fusion arc positioning and timing device for tubing comprising a pair of rings, said rings being spaced from each other, each of said rings being formed in complementary halves, means detachably securing the halves of the rings together, a pair of axially arranged cylinders, said cylinders each being formed of complementary halves, means detachably securing the halves of both of the cylinders together, a ring gear formed in two complementary halves, means detachably securing the halves of the ring gear together, tubing holding means in the cylinders, a motor mounted on said rings, drive means extending from the motor to said ring gear, an arm, mounting means on said rings to support said arm adjacent to the tubing, and means on said arm to space the arm from the tubing.

6. A fusion arc positioning and timing device for tubing comprising a pair of rings, said rings being spaced from each other, each of said rings being formed in complementary halves, means detachably securing the halves of the rings together, a pair of axially arranged cylinders, said cylinders each being formed of complementary halves, means detachably securing the halves of both of the cylinders together, a ring gear, means detachably securing the ring gear to said cylinders and between said cylinders, tubing holding means in the cylinders, a motor mounted on said rings, drive means extending from the motor to said ring gear, and an arm pivotally mounted on one of said rings to support a welding tip adjacent to the tubing, a bolt threaded in said arm, one end of said bolt bearing against the tubing to space said arm from the tubing.

7. A fusion arc positioning and timing device for tubing comprising a pair of rings, said rings being spaced from each other, each of said rings being formed in complementary halves, means detachably securing the halves of the rings together, a pair of axially arranged cylinders, said cylinders each being formed of complementary halves, means detachably securing the halves of both of the cylinders together, a ring gear formed in two complementary halves, means detachably securing the halves of the ring gear together, tubing holding means in the cylinders, a motor mounted on said rings, drive means extending from the motor to said ring gear, and an arm pivotally mounted on one of said rings to support a welding tip adjacent to the tubing, a bolt threaded in said arm, one end of said bolt bearing against the tubing to space said arm from the tubing.

8. A fusion arc positioning and timing device for tubing comprising a pair of rings, said rings being spaced from each other, a cylinder extending between said rings, means journaling said cylinder on said rings, tubing holding means in the cylinder, a motor, means mounting said motor on said rings, drive means extending from the motor to said cylinder, an arm, means on the arm to support a welding tip, said tip being positioned adjacent to the tubing, and means mounting said arm on said rings whereby said arm extends transversely of the tubing.

9. A fusion arc positioning and timing device for tubing comprising a pair of rings, said rings being spaced from each other, each of said rings being formed in complementary halves, means detachably securing the halves of the rings together, a cylinder, said cylinder being formed of complementary halves, means detachably securing the halves of the cylinder together, means journaling said cylinder on said rings, tubing holding means in the cylinder, a motor mounted on said rings, drive means extending from the motor to said cylinder, an arm, means on the arm to support a welding tip, said tip being positioned adjacent to the tubing, and means mounting said arm on said rings whereby said arm extends transversely of the tubing.

10. A fusion arc positioning and timing device for tubing comprising a pair of rings, said rings being spaced from each other, a pair of axially arranged cylinders, a ring gear positioned between the cylinders, means detachably securing the ring gear to the cylinders, means journaling said cylinders on said rings, tubing holding means in the cylinder, a motor mounted on said rings, drive means extending from the motor to the ring gear, an arm, means on the arm to support a welding tip, said tip being positioned adjacent to the tubing, and means mounting said arm on said rings whereby said arm extends transversely of the tubing.

11. A fusion arc positioning and timing device for tubing comprising a pair of rings, said rings being spaced from each other, each of said rings being formed in complementary halves, means detachably securing the halves of the rings together, a cylinder, said cylinder being formed of complementary halves, means detachably securing the halves of the cylinder together, a plurality of rollers journaled on each of the rings, said rollers engaging the cylinder to journal said cylinder on the rings, tubing holding means in the cylinder, a motor mounted on said rings, drive means extending from the motor to said cylinder, an arm, means on the arm to support a welding tip, said tip being positioned adjacent to the tubing, and means mounting said arm on said rings whereby said arm extends transversely of the tubing.

12. A fusion arc positioning and timing device for tubing comprising a pair of rings, said rings being spaced from each other, a pair of axially arranged cylinders, a ring gear positioned between the cylinders, means detachably securing the ring gear to the cylinders, a plurality of rollers journaled on each of the rings, said rollers engaging the cylinders to journal said cylinders on the rings, tubing holding means in the cylinders, a motor mounted on said rings, drive means extending from the motor to said ring gear to rotate the cylinders relative to said rings, an arm, means on the arm to support a welding tip, said tip being positioned adjacent to the tubing, and means mounting said arm on said rings whereby said arm extends transversely of the tubing.

References Cited in the file of this patent

UNITED STATES PATENTS

| | | |
|---|---|---|
| 1,499,499 | Bienenstok | July 1, 1924 |
| 1,509,507 | Gruenfeldt | Sept. 23, 1924 |
| 1,550,651 | Charter | Aug. 18, 1925 |
| 1,782,461 | Chapman | Nov. 25, 1930 |
| 1,818,859 | McIlvin | Aug. 11, 1931 |
| 1,889,319 | McKiernan | Nov. 29, 1932 |
| 2,817,745 | Pilia et al. | Dec. 24, 1957 |